United States Patent
Kim et al.

(10) Patent No.: US 9,467,528 B2
(45) Date of Patent: Oct. 11, 2016

(54) METHOD FOR ACCELERATING WEB SERVER BY PREDICTING HYPERTEXT TRANSFER PROTOCOL (HTTP) REQUESTS AND WEB SERVER ENABLING THE METHOD

(71) Applicant: ELECTRONICS AND TELECOMMUNICATIONS RESEARCH INSTITUTE, Daejeon (KR)

(72) Inventors: Ik Soon Kim, Daejeon (KR); Sun Ja Kim, Daejeon (KR); Chae Kyu Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 177 days.

(21) Appl. No.: 14/332,511

(22) Filed: Jul. 16, 2014

(65) Prior Publication Data
US 2015/0026288 A1    Jan. 22, 2015

(30) Foreign Application Priority Data
Jul. 17, 2013    (KR) ........................ 10-2013-0084195

(51) Int. Cl.
*G06F 15/167*    (2006.01)
*H04L 29/08*    (2006.01)
*G06F 12/08*    (2016.01)

(52) U.S. Cl.
CPC ........... *H04L 67/2847* (2013.01); *H04L 67/02* (2013.01); *G06F 12/0862* (2013.01)

(58) Field of Classification Search
CPC ............. H04L 67/2847; H04L 67/02; H04N 21/23106; G06F 12/0862; G06F 29/0809
See application file for complete search history.

(56) References Cited

U.S. PATENT DOCUMENTS

| 7,047,485 | B1   | 5/2006  | Klein et al. |
| 7,720,936 | B2 * | 5/2010  | Plamondon ......... H04L 67/2852  709/219 |
| 7,783,757 | B2 * | 8/2010  | Plamondon ......... H04L 67/2847  709/217 |
| 7,809,818 | B2 * | 10/2010 | Plamondon ......... G06F 12/0862  709/217 |
| 8,463,843 | B2 * | 6/2013  | Subbanna ............... H04L 47/10  709/202 |
| 8,725,849 | B1 * | 5/2014  | Lloyd ............... G06F 17/30902  709/220 |
| 9,275,162 | B2 * | 3/2016  | Brown ............... G06F 17/30902 |

(Continued)

FOREIGN PATENT DOCUMENTS

KR    10-2002-0011016 A    2/2002
KR       10-0663498 B1     1/2007

Primary Examiner — Krisna Lim
(74) Attorney, Agent, or Firm — LRK Patent Law Firm

(57) ABSTRACT

Provided is a method of improving performance of a web server by predicting a Hypertext Transfer Protocol (HTTP) request and the web server enabling the method, including transmitting, to an HTTP requester, at least one web content among web contents including static web contents and dynamic web contents in response to an HTTP request, selecting, from the web contents, a required web content to be additionally transmitted to the HTTP requester and a potential web content to be additionally transmitted to the HTTP requester, determining, among the potential web content, a web content to be preloaded, and storing, in a document cache, the required web content and the web content to be preloaded.

14 Claims, 4 Drawing Sheets

(56) References Cited

U.S. PATENT DOCUMENTS

| | | | |
|---|---|---|---|
| 2006/0294223 A1* | 12/2006 | Glasgow | H04L 67/2847 709/224 |
| 2013/0159383 A1* | 6/2013 | Tuliani | H04L 67/2842 709/203 |
| 2014/0279851 A1* | 9/2014 | Rangarajan | G06F 17/3048 707/609 |
| 2014/0379840 A1* | 12/2014 | Dao | H04L 67/2847 709/213 |
| 2015/0256641 A1* | 9/2015 | Agarwal | H04L 67/2847 709/203 |

* cited by examiner

METHOD FOR ACCELERATING WEB SERVER BY PREDICTING HYPERTEXT TRANSFER PROTOCOL (HTTP) REQUESTS AND WEB SERVER ENABLING THE METHOD

CROSS-REFERENCE TO RELATED APPLICATION

This application claims the priority benefit of Korean Patent Application No. 10-2013-0084195, filed on Jul. 17, 2013, in the Korean Intellectual Property Office, the disclosure of which is incorporated herein by reference.

BACKGROUND

1. Field of the Invention

The present invention relates to a method of improving performance of a web server by predicting Hypertext Transfer Protocol (HTTP) requests and the web server enabling the method.

2. Description of the Related Art

Recently, rapid developments are being made in technology related to the World Wide Web, or web, and accordingly, attempts to connect a human being to a machine, a machine to a machine, and a device to a device through the web are ongoing. Also, with the introduction of the web, numerous network communication protocols in an existing computer network are being replaced with web protocols and thus, penetration and influence of the web are expected to be furthered moving forward. In line with such a trend, functions and performance of the web have been extended based on the establishment of web standards, for example, Hypertext Markup Language (HTML) 5 and next generation Hypertext Transfer Protocol (HTTP).

Also, popularity and propagation of the web leads to a rapid increase of web contents and thus, performance of a web server has become more important than ever. Recently, numerous web servers have been constructed to provide a variety of services. Transmission of the web contents has also increased exponentially compared to past usage. In consideration of the trend described in the foregoing, performance of the web server is expected to be more important in the future.

SUMMARY

According to an aspect of the present invention, there is provided a method of improving performance of a web server by predicting a Hypertext Transfer Protocol (HTTP) request including transmitting, to an HTTP requester, at least one web content among web contents including static web contents and dynamic web contents in response to an HTTP request, selecting, from the web contents, a required web content to be additionally transmitted to the HTTP requester and a potential web content to be additionally transmitted to the HTTP requester, determining, among the potential web content, a web content to be preloaded, and storing, in a document cache, the required web content and the web content to be preloaded.

The method may include further registering the web contents.

When a web content to be registered is a static web content, the registering may include analyzing a substance of the static web content to be registered, extracting, based on the analyzed substance of the static web content, information necessary to select, from the web contents, the required web content and the potential web content, and storing the extracted information in a lookup table.

When the at least one web content to be transmitted to the HTTP requester is the static web content, the selecting may include extracting, based on the lookup table, the required web content and the potential web content.

When the at least one web content to be transmitted to the HTTP requester is the dynamic web content, the selecting may include analyzing a substance of the dynamic web content to be transmitted to the HTTP requester and extracting, based on the analyzed substance of the dynamic web content, the required web content and the potential web content.

The determining may be performed based on at least one of memory occupancy of the document cache and an HTTP request frequency.

The storing may include searching the document cache for the required web content and the web content to be preloaded, loading, when at least one of the required web content and the web content to be preloaded is determined to be absent in the document cache as a result of the searching, the at least one web content from an auxiliary memory, and storing the loaded web content in the document cache.

The storing may be performed asynchronously with the transmitting.

The selecting may be performed during a runtime delay caused by transmission of the at least one dynamic web content to the HTTP requester.

According to another aspect of the present invention, there is provided a web server, including an auxiliary memory, a memory including a document cache, a network interface to perform communication with an HTTP requester, a web content transmitter to transmit, to the HTTP requester, at least one web content among web contents including static web contents and dynamic web contents in response to an HTTP request, a web content selector to select, from the web contents, a required web content to be additionally transmitted to the HTTP requester and a potential web content to be additionally transmitted to the HTTP requester, a preloading web content determiner to determine, among the potential web content, a web content to be preloaded, and a document cache storage unit to store, in the document cache, the required web content and the web content to be preloaded.

The web server may further include a web content registerer to register the web contents.

When a web content to be registered is a static web content, the web content registerer may include a static web content analyzer to analyze a substance of the static web content to be registered, a selection information extractor to extract information necessary to select, from the web contents, the required web content and the potential web content, based on the analyzed substance of the static web content, and a lookup table storage unit to store the extracted information in a lookup table.

When the at least one web content to be transmitted to the HTTP requester is the static web content, the web content selector may include a static web content extractor to extract, based on the lookup table, the required web content and the potential web content.

When the at least one web content to be transmitted to the HTTP requester is a dynamic web content, the web content selector may include a dynamic web content analyzer to analyze a substance of the at least one dynamic web content to be transmitted to the HTTP requester, and a dynamic web content extractor to extract, based on the analyzed substance of the dynamic web content, the required web content and the potential web content.

The preloading web content determiner may determine the web content to be preloaded based on at least one of memory occupancy of the document cache and an HTTP request frequency.

The document cache storage unit may include a web content searcher to search the document cache for the required web content and the web content to be pre loaded, a web content loader to load, when at least one of the required web content and the web content to be preloaded is determined to be absent in the document cache as a result of the searching, the at least one web content from the auxiliary memory, and a storage unit to store the loaded web content in the document cache.

The document cache storage unit may be performed asynchronously with the web content transmitter.

The web content selector may select, from the web contents, the required web content and the potential web content during a runtime delay caused by transmission of the at least one dynamic web content to the HTTP requester.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
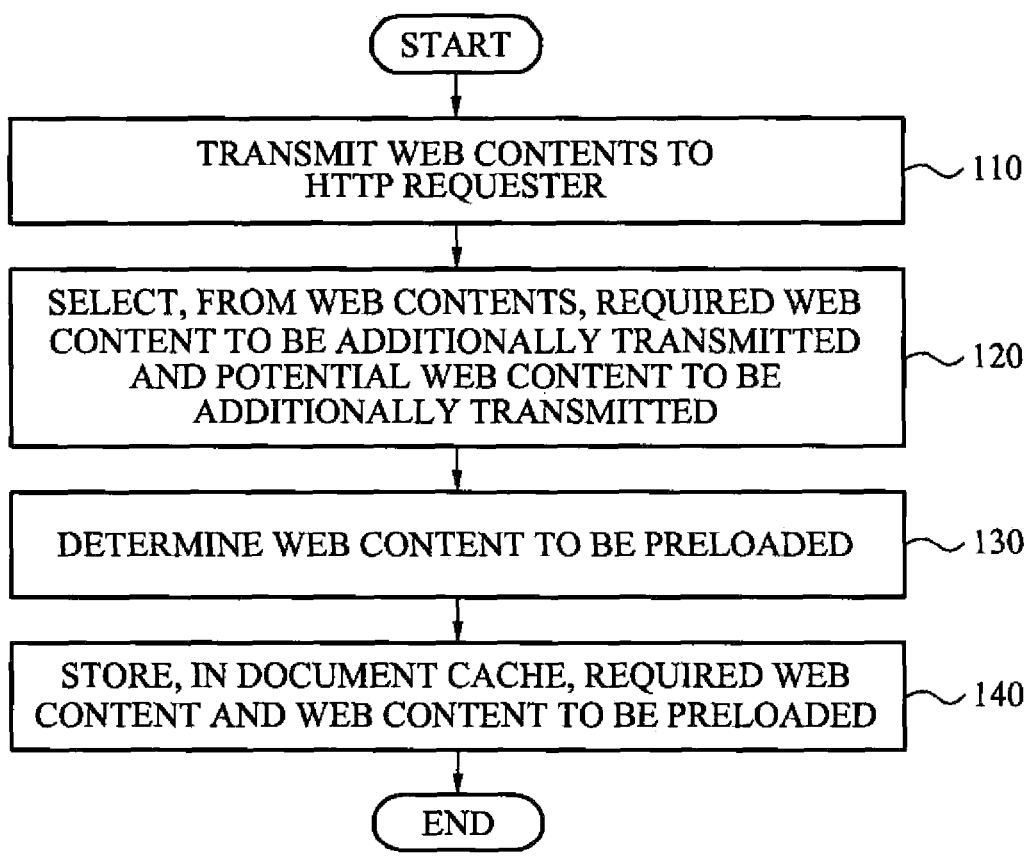
FIG. 1 is a flowchart illustrating a method of improving performance of a web server by predicting a Hypertext Transfer Protocol (HTTP) request according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a flowchart illustrating a method of improving performance of a web server by predicting a Hypertext Transfer Protocol (HTTP) request according to an embodiment of the present invention.

Referring to FIG. 1, in operation 110, at least one web content among web contents may be transmitted to an HTTP requester in response to the HTTP request. Here, the web contents may include static web contents and dynamic web contents. Also, the web contents may refer to web contents processed and distributed online. For example, a Hypertext Markup Language (HTML) document may include the web contents. Particularly, the HTTP requester may request a web content to the web server. In this example, the HTTP requester may be a client or another web server. Also, the web server may transmit, in response to the HTTP request, the web content requested by the HTTP requester. Here, the web server may include a memory including a document cache and an auxiliary memory such as a hard disk, and store web contents in the document cache or the auxiliary memory. The web server may search for the web content requested by the HTTP requester, the web contents stored in the document cache or the auxiliary memory, and transmit the web content to the HTTP requester.

In operation 120, from the web contents, a required web content to be additionally transmitted to the HTTP requester and a potential web content to be additionally transmitted to the HTTP requester are selected. Here, the required web content may refer to a web content that must be additionally transmitted to the HTTP requester after transmission of a web page requested by the HTTP requester. The potential web content may refer to a web content that may be additionally requested by the HTTP requester.

Also, an amount of time required to select the required web content and the potential web content may vary based on a type of the web content to be transmitted to the HTTP requester. The web server may register web contents. Here, when a web content to be registered is a static web content, the required web content and the potential web content may be selected when the static web content is registered. In a case of a dynamic web content, the selecting of the required web content and the potential web content may not be performed when registering the dynamic web content, due to a characteristic of the dynamic web content being generated upon the HTTP request and transmitted to the HTTP requester. More particularly, a substance of the static web content to be registered may be analyzed when registering the static web content. Also, based on the analyzed substance of the static web content, information necessary to select the required web content and the potential web content from the web contents may be extracted. The information necessary for the selecting may be stored in a lookup table. Thus, when the at least one web content to be transmitted to the HTTP requester is the static web content, the required web content and the potential web content may be extracted based on the lookup table when registering the static web content.

When the at least one web content to be transmitted to the HTTP requester is the dynamic web content, the required web content and the potential web content may be selected from the web contents when transmitting the at least one dynamic web content to the HTTP requester. Generally, in a case of receiving and transmitting a material between the HTTP requester and the web server through a network, a runtime delay may occur due to a network transmission. During the runtime delay, the required web content and the potential web content may be selected. For example, the required web content and the potential web content may be effectively selected through parallel processing, during the runtime delay. The substance of the at least one dynamic web content to be transmitted to the HTTP requester may be analyzed. Subsequently, the information necessary for the selecting may be generated based on the analyzed substance of the at least one dynamic web content. Based on the generated information, the required web content and the potential web content may be extracted.

In operation 130, a web content to be preloaded may be determined among the potential web content. Here, the web content to be preloaded may refer to a web content with a high priority among the potential web content and stored, in advance, in the document cache from an auxiliary memory. More particularly, the web content to be preloaded may be determined based on at least one of memory occupancy of the document cache and an HTTP request frequency. Here, the memory occupancy of the document cache may refer to an occupancy taken by the document cache in a memory of the web server. The HTTP request frequency may refer to a frequency of requests made by the HTTP requester that are currently entering the web server. For example, when the memory occupancy of the document cache is high, a web content with a relatively lower priority may be determined to be the web content to be preloaded. Conversely, when the memory occupancy of the document cache is low, only a web content with a high priority may be determined to be the web content to be preloaded, whereas none of the potential web content may be determined to be the web content to be preloaded. For example, when the HTTP request frequency is high, a current working ratio of the web server may increase. Thus, numerous web contents may be stored in the document cache and the web content with a high priority may be determined as the web content to be preloaded. Conversely, when the HTTP request frequency is low, a lower number of web contents may be stored in the document cache. Thus, the web content with a low priority may be determined as the web content to be preloaded.

In operation 140, the required web content and the web content to be preloaded may be stored in the document cache. Generally, a web content may be stored in the auxiliary memory such as a hard disk and then transmitted, through a network, to the HTTP requester in response to the HTTP request. However, a speed of reading and writing the auxiliary memory such as the hard disk may be slower when compared to a speed of reading and writing the memory and thus, an issue of speed deterioration may arise when providing a web service. Conversely, the document cache may relocate a portion of previously requested web contents from the auxiliary memory to the memory and transmit a web content in the memory in response to a request identical to a previously made request and thus, an additional access to the auxiliary memory may be reduced. Accordingly, using the document cache may improve the speed of the web service in comparison to use of the auxiliary memory. However, storing, in the memory, the web contents stored in the auxiliary memory may not be possible, in general, due to memory limitations. According to an embodiment of the present invention, the required web content and the web content to be preloaded may be stored in the document cache and thus, the document cache may be used more effectively and a response speed of the web server may be improved. During transmission of the at least one web content to the HTTP requester, the required web content and the web content to be preloaded may be stored in the document cache, which may be performed asynchronous with the transmission of the at least one web content to the HTTP requester. More particularly, the required web content and the web content to be preloaded may be searched for in the document cache. When at least one of the required web content and the web content to be preloaded is determined to be absent in the document cache as a result of the search, the at least one web content absent in the document cache may be loaded from the auxiliary memory. In this case, the at least one web content absent in the document cache may be loaded from the auxiliary memory based on the memory occupancy of the document cache. Also, when a portion of the required web content and the web content to be preloaded may not be stored in the document cache due to limitations of the document cache, the required web content may be stored on a preferential basis. In this case, the web content to be preloaded may be stored in the document cache on a priority basis.

According to an embodiment of the present invention, the at least one web content absent in the loaded document cache may be stored in the document cache and thus, the required web content and the web content to be preloaded may be provided more swiftly in response to a future HTTP request.

Figure 2:
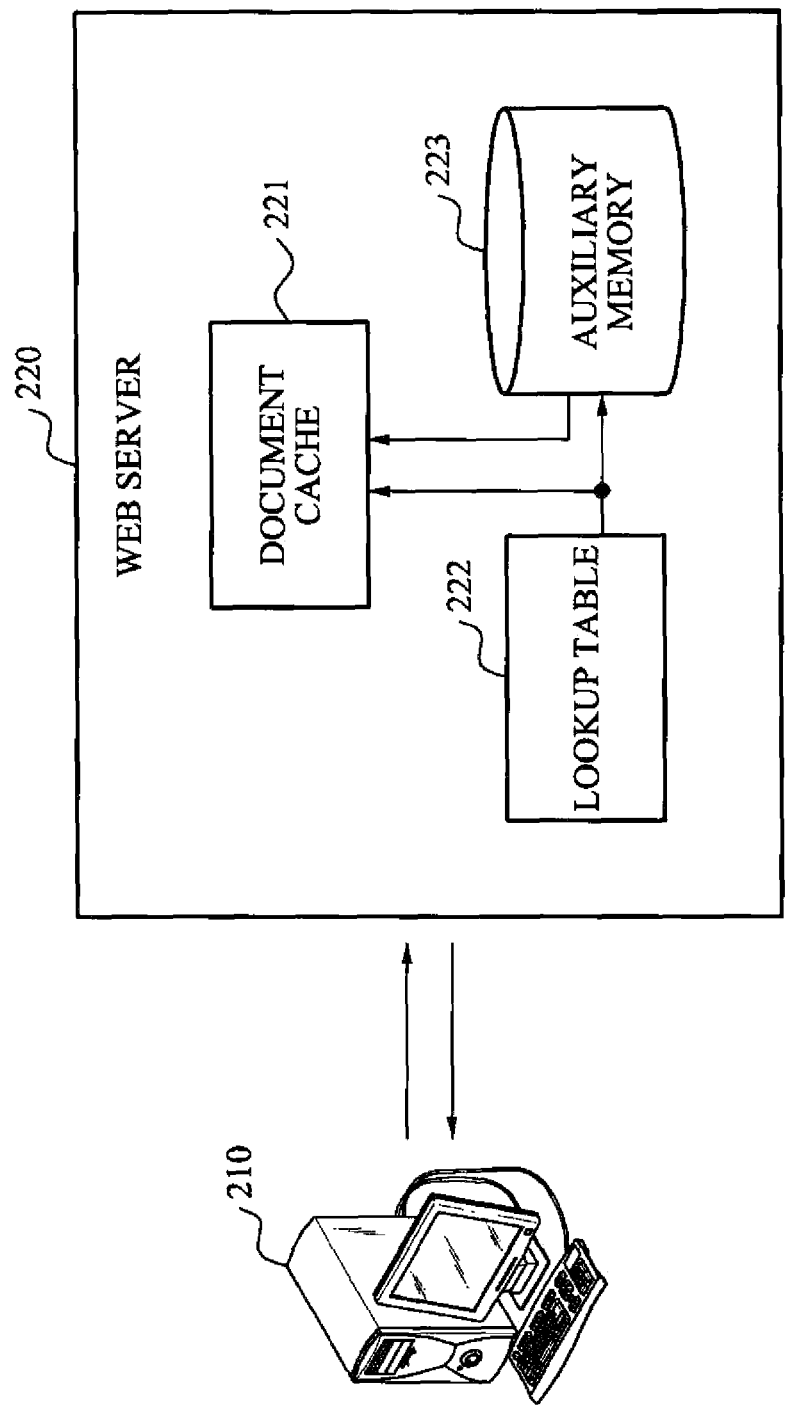
FIG. 2 is a diagram illustrating an example in which a static web content is transmitted to an HTTP requester according to an embodiment of the present invention.

FIG. 2 is a diagram illustrating an example in which a static web content is transmitted to an HTTP requester according to an embodiment of the present invention.

Referring to FIG. 2, a web server 220 may include a document cache 221, a lookup table 222, and an auxiliary memory 223. When the web server 220 receives an HTTP request for a static web content from an HTTP requester 210, the web server 220 may search the document cache 221 or the auxiliary memory 223 for at least one static web content in response to the HTTP request for the static web content and transmit an HTTP response. Also, simultaneously with transmission of the requested static web content, the web server 220 may search for necessary information, using the lookup table 222 calculated in advance when registering the static web content, to select a required web content to be additionally transmitted and a potential web content to be additionally transmitted to the HTTP requester from web contents. The web server 220 may select the required web content and the potential web content based on the found information. Also, the web server 220 may determine, among the web contents, a web content to be preloaded based on at least one of memory occupancy of the document cache 221 and an HTTP request frequency. Thus, the web server 220 may search the document cache for the required web content and the web content to be preloaded. Here, when the required web content and the web content to be preloaded is absent in the document cache 221, the web server 220 may load, from the auxiliary memory 223, the required web content and the absent web content to be preloaded in the document cache 221 and store the same in the document cache 221.

Figure 3:
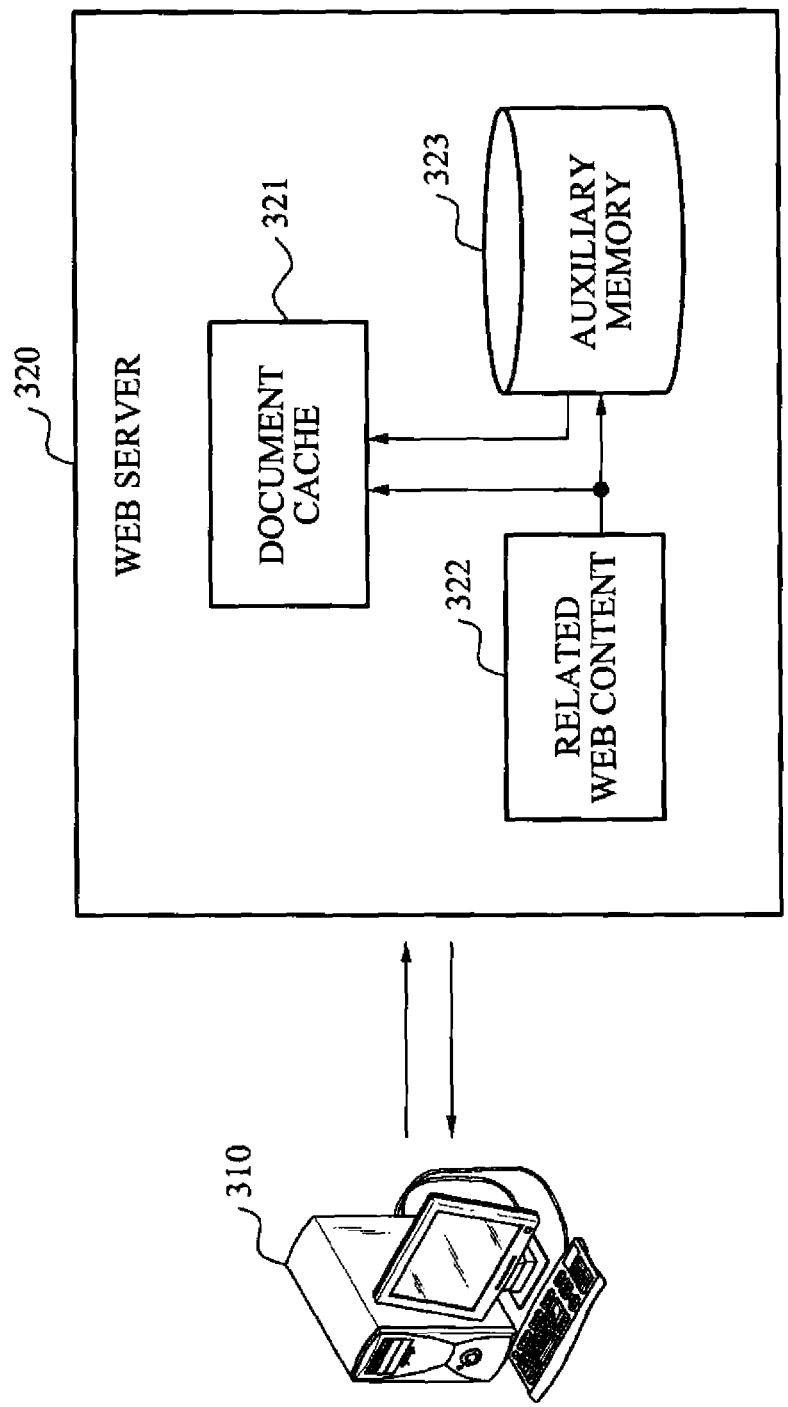
FIG. 3 is a diagram illustrating an example in which a dynamic web content is transmitted to an HTTP requester according to an embodiment of the present invention.

FIG. 3 is a diagram illustrating an example in which a dynamic web content is transmitted to an HTTP requester according to an embodiment of the present invention.

Referring to FIG. 3, when a web server 320 receives an HTTP request for the dynamic web content from an HTTP requester 310, the web server 320 may search a document cache 321 or an auxiliary memory 323 for at least one dynamic web content in response to the HTTP request and transmit an HTTP response. Also, simultaneously with transmission of the requested dynamic web content, the web server 320 may analyze a substance of the at least one dynamic web content to be transmitted to the HTTP requester, which may be performed asynchronously with the transmission of the at least one dynamic web content. The web server 320 may extract, based on the analyzed substance of the at least one dynamic web content, a required web content to be additionally transmitted and a potential web content to be additionally transmitted. Also, the web server 320 may determine, among the potential web content, a web content to be preloaded based on at least one of memory occupancy of the document cache 321 and an HTTP request frequency. The web server 320 may search the document cache 321 for a related web content 322 such as the required web content and the web content to be preloaded. Here, when the related web content 322 is absent in the document cache 321, the web server 320 may load, from the auxiliary memory 323, the related web content 322 absent in the document cache 321 and store the content in the document cache 321. Thus, when a future HTTP request for the web content stored in the document cache 321 is received from the HTTP requester 310, the requested web content may be immediately provided to the HTTP requester 310 without an access to the auxiliary memory 323.

Figure 4:
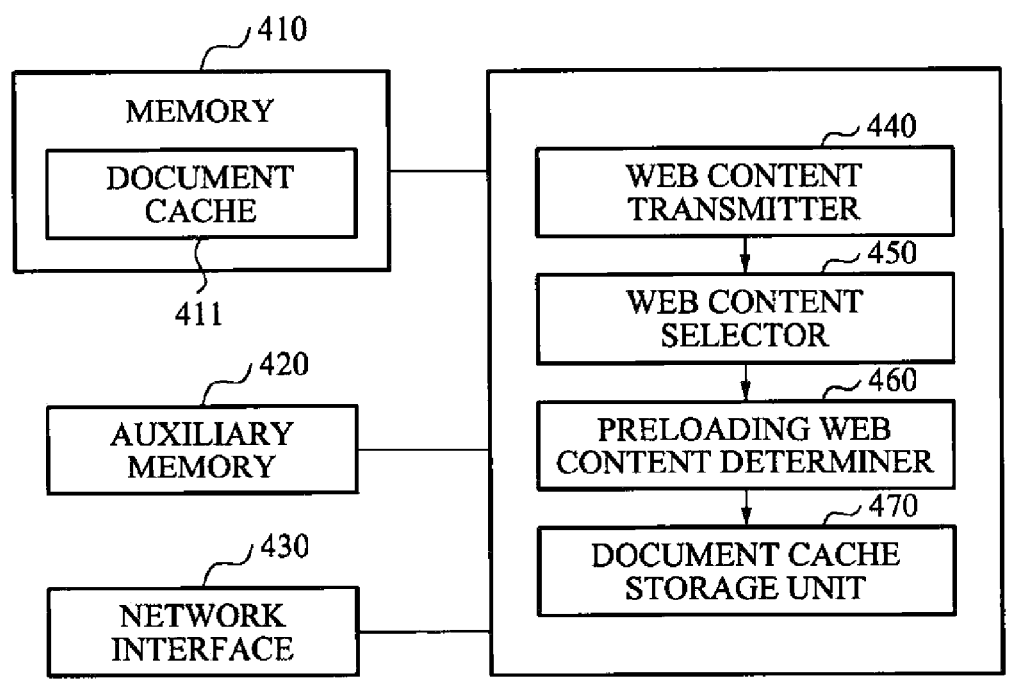
FIG. 4 is a block diagram illustrating a web server according to an embodiment of the present invention.

FIG. 4 is a block diagram illustrating a web server according to an embodiment of the present invention.

Referring to FIG. 4, the web server may include a memory 410 including a document cache 411, an auxiliary memory 420, and a network interface 430 performing communication with an HTTP requester.

A web content transmitter 440 may transmit at least one web content among web contents to the HTTP requester, in response to an HTTP request.

A web content selector 450 may select, from the web contents, a required web content to be additionally transmitted to the HTTP requester and a potential web content to be additionally transmitted to the HTTP requester.

A preloading web content determiner 460 may determine, among the potential web content, a web content to be preloaded.

A document cache storage unit 470 may store, in the document cache 411, the required web content and the web content to be preloaded.

Descriptions of a web server provided with reference to FIGS. 1 through 3 may be applied to FIG. 4 and thus, repeated detailed descriptions of the web server of FIG. 4 are omitted herein for conciseness.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of improving performance of a web server based on prediction of a Hypertext Transfer Protocol (HTTP) request, the method comprising:
    transmitting, to an HTTP requester, at least one web content among web contents comprising static web contents and dynamic web contents, in response to an HTTP request;
    selecting, from the web contents, a required web content to be additionally transmitted to the HTTP requester and a potential web content to be additionally transmitted to the HTTP requester;
    determining, among the potential web content, a web content to be preloaded;
    storing, in a document cache, the required web content and the web content to be preloaded; and
    registering the web contents,
    wherein, when a web content to be registered is a static web content, the registering comprises:
    analyzing a substance of the static web content to be registered;
    extracting, based on the analyzed substance of the static web content, information necessary to select, from the web contents, the required web content and the potential web content; and
    storing the extracted information in a lookup table.

2. The method of claim 1, wherein, when the at least one web content to be transmitted to the HTTP requester is the static web content, the selecting comprises:
    extracting, based on the lookup table, the required web content and the potential web content.

3. The method of claim 1, wherein, when the at least one web content to be transmitted to the HTTP requester is a dynamic web content, the selecting comprises:
    analyzing a substance of the at least one dynamic web content to be transmitted to the HTTP requester; and
    extracting, based on the analyzed substance of the at least one dynamic web content, the required web content and the potential web content.

4. The method of claim 1, wherein the determining is performed based on at least one of memory occupancy of the document cache and an HTTP request frequency.

5. The method of claim 1, wherein the storing comprises:
    searching the document cache for the required web content and the web content to be preloaded;
    loading, when at least one of the required web content and the web content to be preloaded is determined to be absent in the document cache as a result of the searching, the at least one web content absent in the document cache from an auxiliary memory; and
    storing the loaded web content in the document cache.

6. The method of claim 1, wherein the storing is performed asynchronously with the transmitting.

7. The method of claim 3, wherein the selecting is performed during a runtime delay caused by transmission of the at least one dynamic web content to the HTTP requester.

8. A web server, comprising:
    an auxiliary memory;
    a memory comprising a document cache;
    a network interface to perform communication with an HTTP requester;
    a web content transmitter to transmit, to the HTTP requester, at least one web content among web contents comprising static web contents and dynamic web contents, in response to an HTTP request;
    a web content selector to select, from the web contents, a required web content to be additionally transmitted to the HTTP requester and a potential web content to be additionally transmitted to the HTTP requester;

a preloading web content determiner to determine, among the potential web content, a web content to be preloaded;

a document cache storage unit to store, in the document cache, the required web content and the web content to be preloaded; and a web content registerer to register the web contents, wherein, when a web content to be registered is a static web content, the web content registerer comprises:

a static web content analyzer to analyze a substance of the static web content to be registered;

a selection information extractor to extract information necessary to select, from the web contents, the required web content and the potential web content, based on the analyzed substance of the static web content; and a lookup table storage unit to store the extracted information in a lookup table.

9. The web server of claim 8, wherein, when the at least one web content to be transmitted to the HTTP requester is the static web content, the web content selector comprises:

a static web content extractor to extract, based on the lookup table, the required web content and the potential web content.

10. The web server of claim 8, wherein, when the at least one web content to be transmitted to the HTTP requester is a dynamic web content, the web content selector comprises:

a dynamic web content analyzer to analyze a substance of the at least one dynamic web content to be transmitted to the HTTP requester; and a dynamic web content extractor to extract, based on the analyzed substance of the dynamic web content, the required web content and the potential web content.

11. The web server of claim 8, wherein the preloading web content determiner determines the web content to be preloaded based on at least one of memory occupancy of the document cache and an HTTP request frequency.

12. The web server of claim 8, wherein the document cache storage unit comprises:

a web content searcher to search the document cache for the required web content and the web content to be preloaded;

a web content loader to load, when at least one of the required web content and the web content to be preloaded is determined to be absent in the document cache as a result of the searching, the at least one web content absent in the document cache from the auxiliary memory; and a storage unit to store the loaded web content in the document cache.

13. The web server of claim 8, wherein the document cache storage unit is performed asynchronously with the web content transmitter.

14. The web server of claim 10, wherein the web content selector selects, among the web contents, the required web content and the potential web content during a runtime delay caused by transmission of the at least one dynamic web content to the HTTP requester.

* * * * *